(12) United States Patent
Geary

(10) Patent No.: US 6,783,134 B2
(45) Date of Patent: Aug. 31, 2004

(54) SKI VEHICLE

(76) Inventor: Brad Geary, 931 E. 300 North, Kaysville, UT (US) 84037

( * ) Notice: Subject to any disclaimer, the term of this patent is extended or adjusted under 35 U.S.C. 154(b) by 0 days.

(21) Appl. No.: 10/264,081

(22) Filed: Oct. 3, 2002

(65) Prior Publication Data

US 2003/0222419 A1 Dec. 4, 2003

Related U.S. Application Data

(60) Provisional application No. 60/384,748, filed on May 30, 2002.

(51) Int. Cl.[7] .............................................. B62B 13/00
(52) U.S. Cl. ......................... 280/21.1; 280/16; 280/25; 280/20; 280/22.1; 280/845
(58) Field of Search ........................ 280/21.1, 16, 25, 280/20, 23.1, 12.1, 184, 190, 182, 22.1, 28.14, 845, 28.11, 12.12, 809, 816

(56) References Cited

U.S. PATENT DOCUMENTS

| | | | |
|---|---|---|---|
| 3,063,728 A | | 11/1962 | Patterson |
| 3,438,643 A | | 4/1969 | Spiehs |
| 3,560,012 A | * | 2/1971 | Auer .......................... 280/16 |
| 3,561,783 A | * | 2/1971 | Ellett ......................... 280/16 |
| 3,583,721 A | * | 6/1971 | Doran-Webb ................ 280/16 |
| 3,588,138 A | * | 6/1971 | Cerny, Jr. .................... 280/16 |
| 3,638,960 A | * | 2/1972 | Eaton .......................... 280/16 |
| 3,717,359 A | * | 2/1973 | Peronnon et al. ............. 280/16 |
| 3,858,896 A | * | 1/1975 | Evequoz ...................... 280/16 |
| 3,870,329 A | * | 3/1975 | Evequoz ...................... 280/16 |
| 3,894,746 A | * | 7/1975 | Evequoz ...................... 280/16 |
| 3,917,301 A | | 11/1975 | Fabris |
| 4,063,746 A | | 12/1977 | Hansen |
| 4,254,964 A | | 3/1981 | Gibson |
| 4,552,371 A | | 11/1985 | McFrisby |
| 4,974,868 A | | 12/1990 | Morris |
| 5,013,066 A | * | 5/1991 | Adkins ....................... 280/809 |
| 5,064,208 A | * | 11/1991 | Bibollet ..................... 280/21.1 |
| 5,356,159 A | * | 10/1994 | Butterfield ............... 280/14.22 |
| 5,462,304 A | * | 10/1995 | Nyman ....................... 280/609 |
| 5,553,875 A | | 9/1996 | Ulicne et al. |
| 5,564,729 A | * | 10/1996 | Gomez et al. .............. 280/637 |
| 5,863,051 A | * | 1/1999 | Brenter ........................ 280/16 |
| 6,193,244 B1 | | 2/2001 | Vance |
| 6,457,746 B1 | * | 10/2002 | Schepers .................... 280/809 |
| 2001/0038184 A1 | * | 11/2001 | Stafford ................... 280/14.27 |
| 2003/0038434 A1 | * | 2/2003 | Farrally-Plourde .......... 280/16 |

FOREIGN PATENT DOCUMENTS

DE  3509097 A1 * 9/1985  ........... B62B/17/08

* cited by examiner

Primary Examiner—Brian L. Johnson
Assistant Examiner—J. Allen Shriver
(74) Attorney, Agent, or Firm—Workman Nydegger

(57) ABSTRACT

A ski vehicle includes a frame having a first ski mounted thereon. A steering column having a handlebar attached thereto is rotatably mounted to the frame. A second ski is mounted to the steering column. A seat post has a first end and an opposing second end. The first end of the seat post is hingedly, removably, and/or slidably mounted to the frame. A seat is mounted to the second end of the seat post.

31 Claims, 14 Drawing Sheets

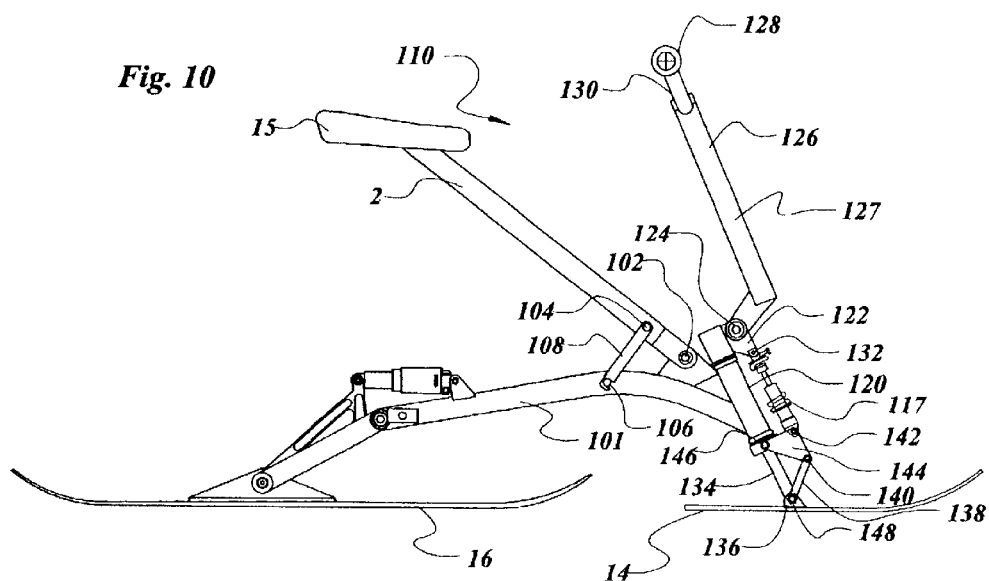
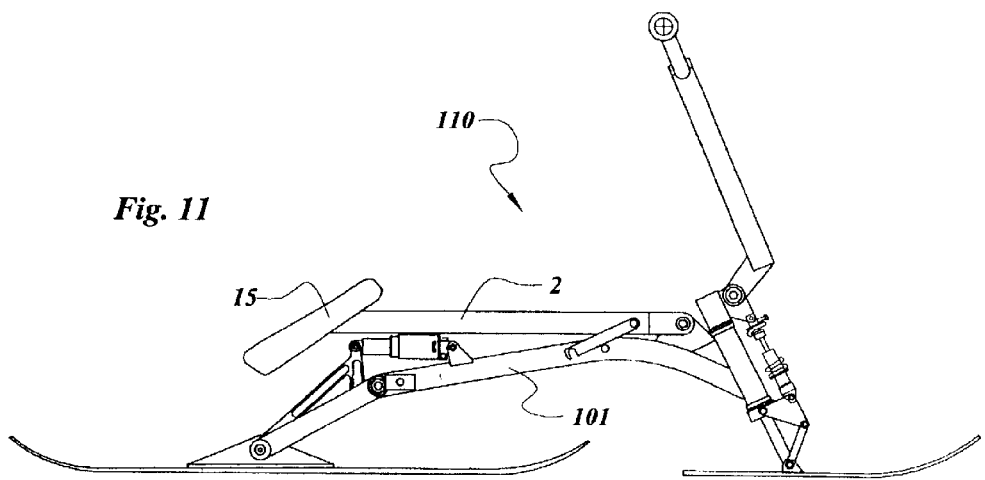

SKI VEHICLE

CROSS-REFERENCE TO RELATED APPLICATIONS

This application claims priority to U.S. Provisional Application Serial No. 60/384,748 filed May 30, 2002 which is incorporated herein by specific reference.

BACKGROUND OF THE INVENTION

1. The Field of the Invention

The present invention relates to gravity propelled ski vehicles.

2. The Relevant Technology

Skibobs, as they are typically known in Europe, have fixed frames with a seat and forward steering column with handlebars. Instead of wheels, however, the skibob slides on short skis with the rear ski being fixed and the front ski being steerable. In addition, they require the rider to wear small auxiliary skis on the feet because the skis fixed to the skibob are relatively narrow.

Prior art skibobs are rather bulky making them difficult to transport and even more difficult to get to the top of the ski mountain. They do not fit well into automobiles and most ski resort chair lifts and trams are not equipped to handle skibob transportation in their present form. Also, because the skis on traditional skibobs are narrow, the rider is required to wear small auxiliary skis on the feet for stability purposes. This can make for painful situations when the skibob goes off a large jump, as the rider has to absorb the impact of landing through the seat and posterior. Prior art skibobs and ski-equipped devices in general have been somewhat difficult to maneuver.

SUMMARY OF THE INVENTION

The present invention includes various embodiments of ski vehicles. In one embodiment, the ski vehicle includes a frame having a forward end and an opposing rear end. The frame includes a steering column bearing at the forward end, and a steering stem journalled in the steering column bearing which provides for the mounting of the steering column on top, the steering column using the attachment point as a pivot point. The steering column also provides the attachment point for a front ski. A rear ski is mounted on the rear end of the frame.

A seat assembly includes a seat post supporting a seat. The seat assembly is pivotally connected at a single point near the steering column so as to selectively move between a raised and lower position. The assembly has positive stops in both the raised and lowered positions.

Other features that can be formed on the ski vehicle include a foot peg projecting from each side of the frame. Wings can be attached to the front and rear skis on both sides near the ends of the skis. A speed reducing mechanism can also be provided.

As mentioned above, a major disadvantage to the traditional skibob is that it's bulkiness does not lend it to transport on a standard ski lift. Select embodiments of the present invention overcome this disadvantage by having the seat post collapsible such that the ski vehicle frame and seat fit underneath the seat of a ski lift. The rider is able to sit down on the ski lift as a normal skier would with the snow bike handlebars resting on the user's lap. When exiting the ski lift the user places one foot underneath one of the foot pegs to support the snow bike until it contacts the snow. The user can then exit the ski lift as a normal skier would, return the seat post to its upright position and begin skiing. In other embodiments, a bracket can be mounted on the frame so as to project therefrom. The bracket is configured to support the frame on a seat of a ski chairlift when the seat of the ski vehicle is in the lowered position.

When transporting the ski vehicle to and from the ski resort, the seat post again is lowered. In one embodiment, the steering assembly can also be folded down and the handlebars can be folded in to provide a compact, easily transported package that can be attached to a ski rack or placed inside a skibag for airline travel.

The use of foot pegs to support the feet, versus the skibob tradition use of small auxiliary skis on the feet of the rider, enables the ski vehicle to create an experience similar to Motocross or BMX. The use of wider skis provides increased stability making it possible to eliminate the auxiliary skis. The foot pegs also allow the rider to use the legs to absorb the impact of bumps and jumps just as Motocross and BMX riders do.

In one embodiment, by adding wings at the ends of the skis, the user is able to have better feel of the snow and terrain. The wings are designed in such a way as to help eliminate sideslip (as when traversing a slope) when gliding in a straight line. When the steering column is turned the front ski is edged up and exposes another surface of the wing to the snow. This surface is designed such that in addition to digging into the snow, it effectively reduces the sidecut radius of the ski and makes turning more predictable and accurate.

Finally, in order to provide the novice rider with a way to regulate their downhill speed as they learn to ride, a speed reduction mechanism can be provided. By pressing a foot pedal a plate is pivoted down into the snow through a hole in the ski. The farther the foot pedal is pushed, the further the plate rotates into the snow thus providing a method to control the speed of the snow vehicle.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

FIG. 10 shows a side plan view of an alternative embodiment of a ski vehicle;

FIG. 11 shows a side plan view of the ski vehicle shown in FIG. 10 with the seat in a retracted position;

DETAILED DESCRIPTION OF THE PREFERRED EMBODIMENTS

Figure 1:
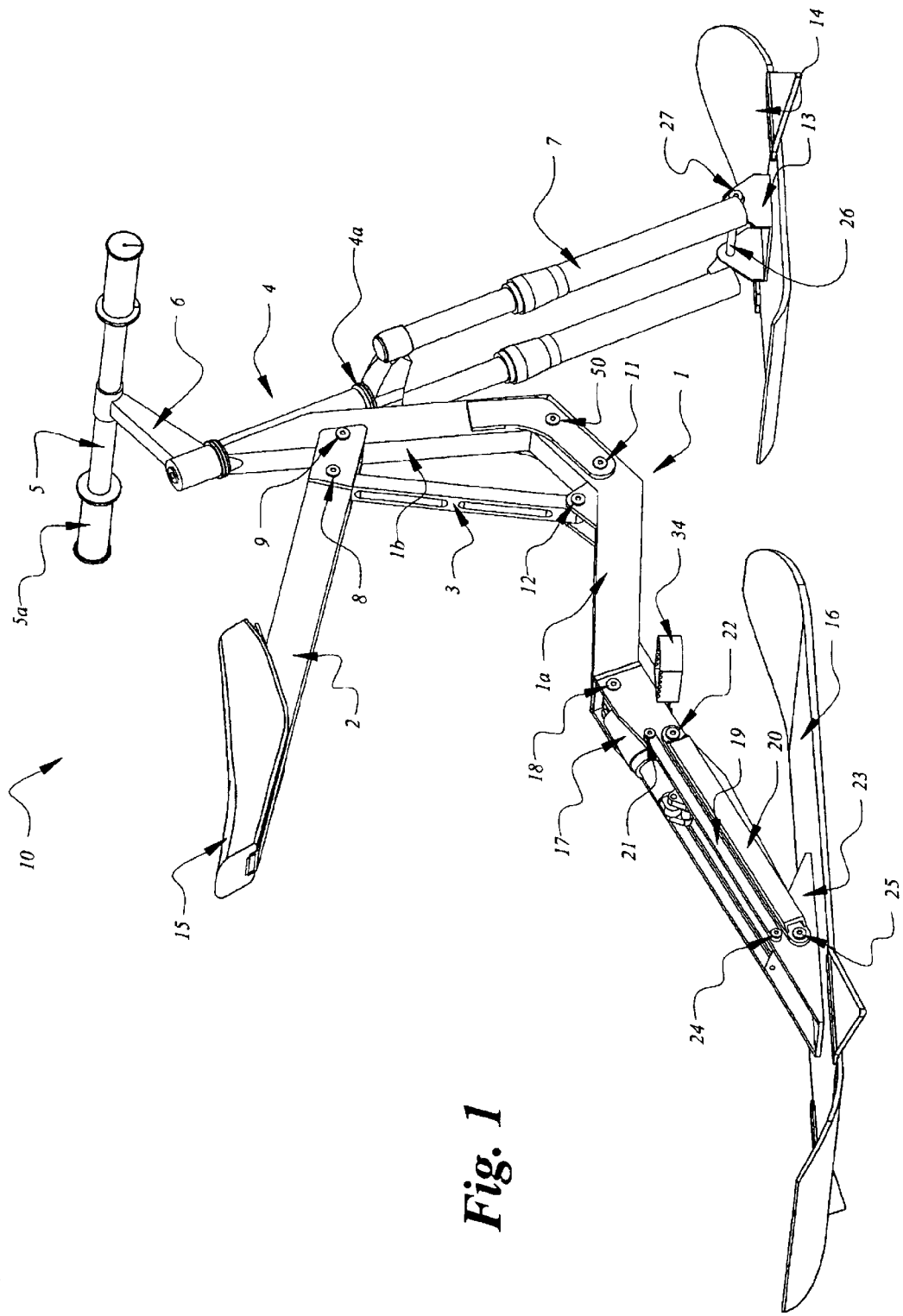
FIG. 1 shows a perspective view of one embodiment of a ski vehicle.

Depicted in FIG. 1 is one embodiment of a ski vehicle 10 incorporating features of the present invention. Ski vehicle 10 includes a frame 1 comprised of an upper subframe 1a hingedly mounted to a lower subframe 1b. Attached to upper subframe 1a is a seat post 2. The seat post 2 is removably attached at a first point 9 to the frame 1 by use of a pin or other form of connector. A seat 15 is mounted to an opposing free end of seat post 2.

A strut 3 extends between lower subframe 1b and seat post 2. A first end of the strut 3 is pivotally connected to the seat post 2 at a connection point 8. Likewise, the second end of the strut 3 is pivotally connected to the lower subframe 1b at a connection point 12. This configuration allows the seat post 2 to be detached from the frame 1 at the first pivot point 9 so that the seat post 2 can be lowered into a retracted position substantially adjacent to the lower portion of the frame 1 (see FIGS. 5 and 6). This allows the rider to lower the seat 15 beneath a ski chair lift while still straddling the ski vehicle 10. The strut 3 acts as a structural member of the frame 1 when it is in the upright position. The pivot point 9 is actually removable such that when the pin or other connecting structure is removed, the seat 15 can then rotate about pivot point 8 and pivot point 12 to achieve that relative retracted position. The foot peg 34 is rigidly mounted to and outwardly projects from each side of lower frame 1a.

Ski vehicle 10 also includes a rear ski 16 having a bracket 23 mounted thereon. Ski 16 has a tail with a square edge and a rounded tip edge. Ski 16 decreases in width from the tail to the tip. Extending between lower frame 1a and bracket 23 is a shock absorber 17, swingarm links 20, parallel links 19, and a suspension linkage mechanism. Swingarm links 20 and parallel links 19 are pivotally attached to lower frame 1a at pivot points 22 and 21, respectively, and pivotally attached to the bracket 23 at pivot points 25 and 24, respectively. This forms a parallelagramic linkage, with the parallelogram being defined by the parallel link 19, the swing arm link 20, and then part of the frame, lower frame 1a and then bracket 23 so that ski 16 will maintain its parallel nature with the frame 1a and is not allowed to freely pivot around pivot point 24 or 25 or 21 or 22. Instead, ski 16 will move in substantially parallel fashion to the lower portion of the frame 1a to make a smoother ride for the rider of the ski vehicle 10.

Figure 2:
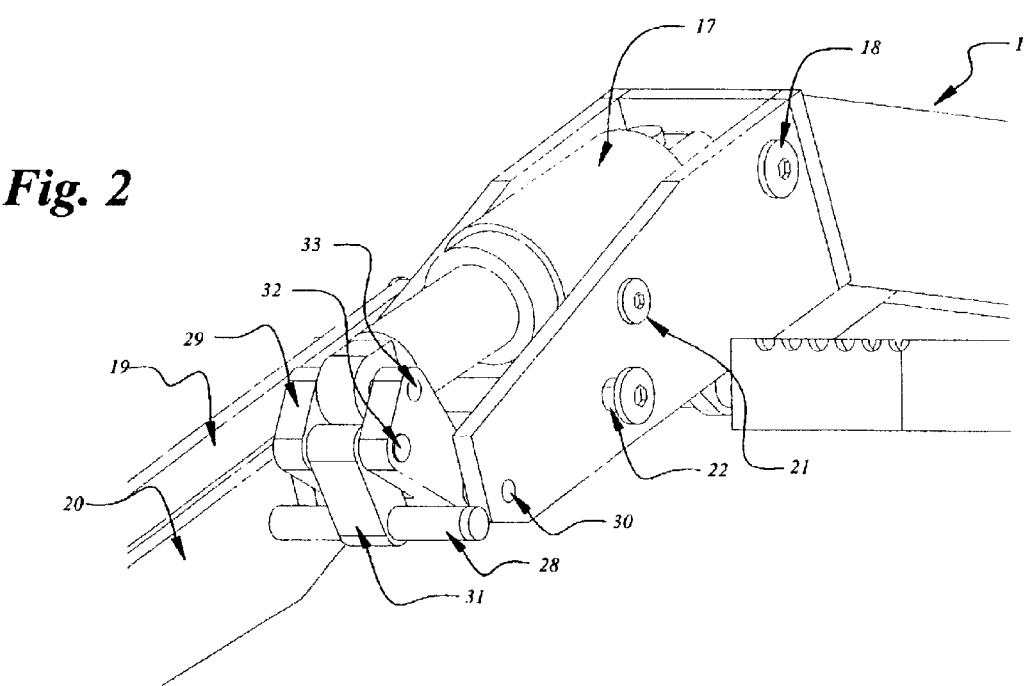
FIG. 2 shows a perspective view of a back linkage assembly of the ski vehicle shown in FIG. 1.

FIG. 2 shows a perspective view of the rear suspension with one swingarm link 20 and one parallel link 19 removed. Swing arm links 20 attach to a first pivot shaft 28. One end of a first link 31 is pivotally attached to pivot shaft 28. The other end of link 31 is pivotally attached to a second link 29 via a second pivot shaft 32. Link 29 has two other pivot points. One of the pivot points allows link 29 to lower frame 1a via a third pivot shaft 30. The other pivot point on link 29 is pivotally attached to shock absorber 17 via a fourth pivot shaft 33. Shock absorber 17 is pivotally attached to lower frame 1a at its other end via pivot shaft 18. When the ski 16 encounters irregularities in the terrain, swingarms 20 and parallel links pivot about their respective pivot points. This action causes pivot shaft 28 to impart a force on link 31 which in turn imparts a force to link 29 causing it to rotate about pivot shaft 30. This further causes shock absorber 17 to compress. The more swingarm 20 rotates around pivot point 22, the more shock absorber 20 compresses and damps the motion to provide a smoother ride.

Returning to FIG. 1, mounted on an upper end of frame 1 is a head tube 4. Rotatably mounted to head tube 4 is a steering column. In the embodiment depicted, the steering column comprises a steerer tube rotatably disposed within head tube 4. A bearing 4a on each end of head tube 4 centers the steerer tube in the head tube 4. Downwardly projecting from the steering column is a front fork assembly 7 having shock absorbers incorporated therein. A bracket 13 connects front fork assembly 7 to a front ski 14. Front ski 14 has a rounded front tip 14b and a square rear tail 14a. Front ski 14 also narrows in width from the front tip to the rear tail.

Connected to the upper end of the steerer tube is a handle bar stem 6. Attached to handle bar stem 6 is a handlebar 5 having standard handlebar grips 5a.

Figure 3:
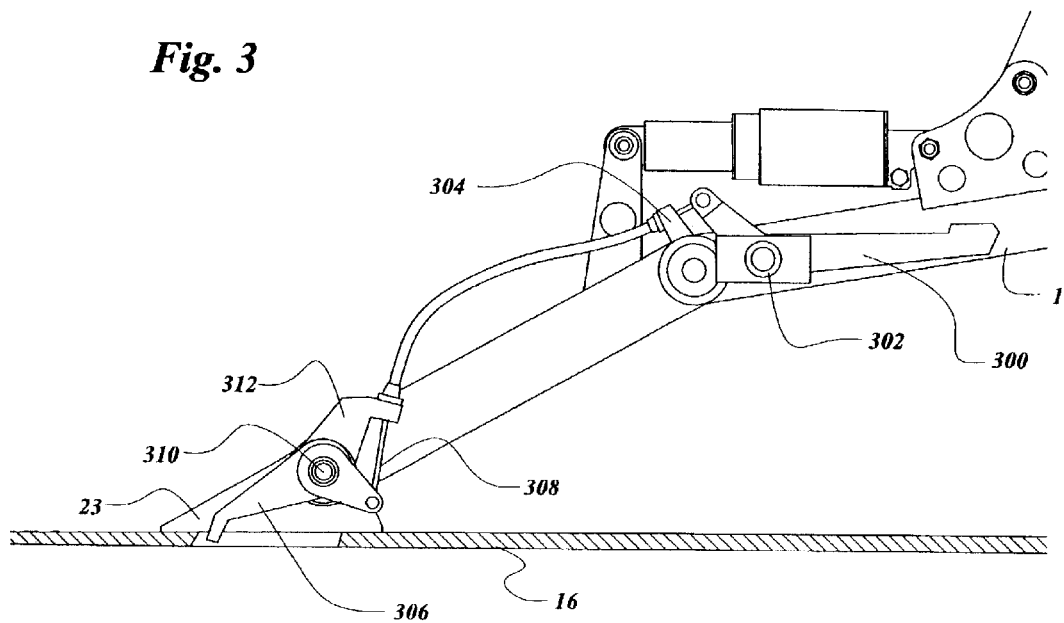
FIG. 3 shows a partial elevation view of a speed reduction mechanism.

Depicted in FIG. 3 is a partial elevation of one embodiment of a speed reducing mechanism. Specifically, a foot pedal 300 is pivotably attached to frame 1 at point 302. A fixed mounting 304 is also attached to frame 1. A typical manufacture cable assembly 308 is fixed at one end to mounting bracket 304. The other fixed end of cable assembly 308 is attached to mounting bracket 312. A skid plate 306 is pivotably attached to ski mount bracket 23. The upper movable end of the cable assembly 308 is attached to foot pedal 300 and the other movable end is attached to skid plate 306.

Figure 4:
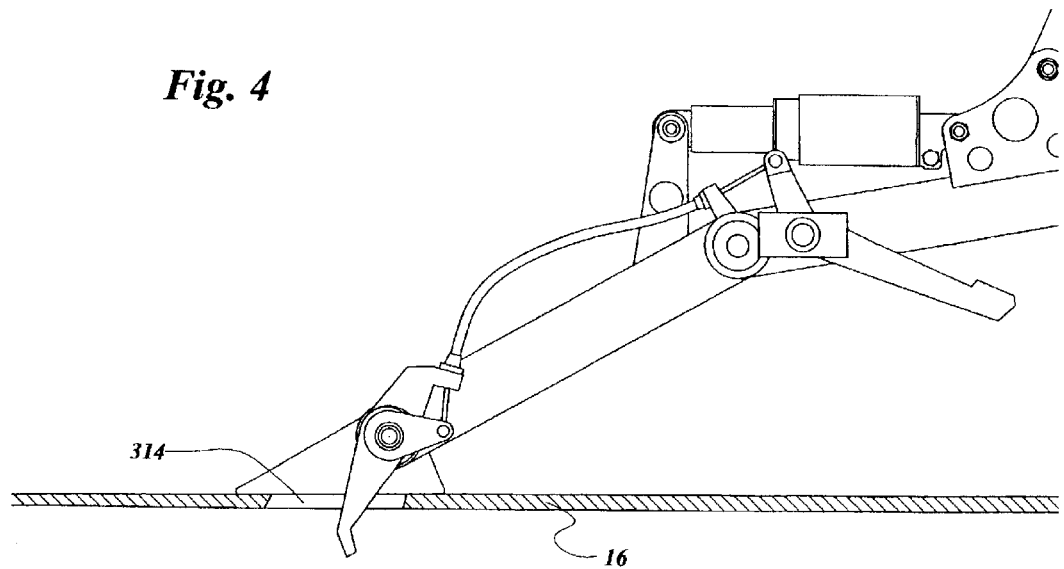
FIG. 4 shows a partial elevation view of the speed reduction mechanism shown in FIG. 3 in a deployed position.

FIG. 4 shows a partial elevation view showing the operation of the speed reducing mechanism. When foot pedal 300 is depressed, the cable assembly 308 rotates skid plate 306 down into the snow through a hole 314 provided in the ski. It will be noted that this mechanism can easily be adapted for use on the front ski by substituting the mounting bracket and brake pedal with standard manufacture handle bar mounted brake mount and lever.

Figure 5:
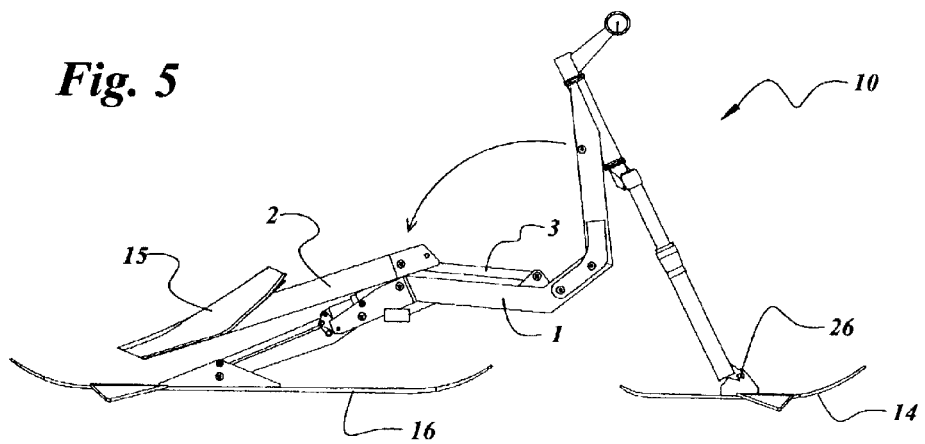
FIG. 5 shows side plan view of the ski vehicle shown in FIG. 1 in a partially folded configuration.

FIG. 5 is an elevation view of ski vehicle 10 in which the pin has been selectively removed so that seat bar 2 disconnects from frame 1. In this disconnected position, seat bar 2 with the seat 15 attached thereto selectively retracts to a lowered position by pivotal movement of the opposing ends strut 3. In the retracted position, seat is substantially adjacent to the lower portion of the frame 1. A rider can straddle the snow vehicle 10 in this retracted position so that as a ski lift chair comes from the rear, the ski vehicle 10 can be held in the rider's hands as they ride the ski lift chair together.

Figure 6:
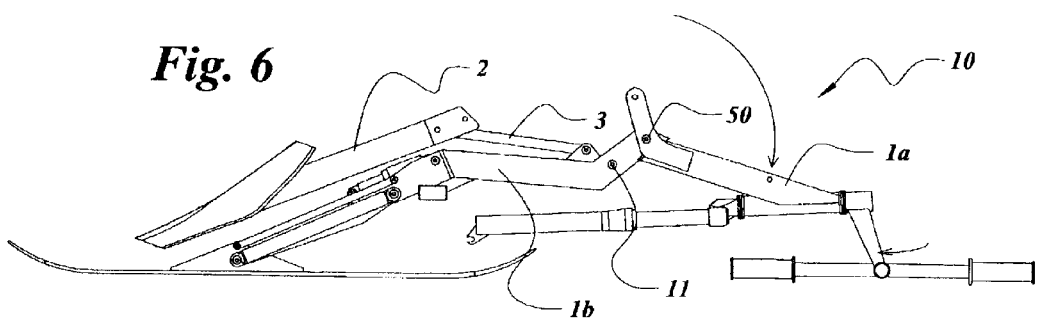
FIG. 6 shows a side plan view of the ski vehicle shown in FIG. 5 in a fully folded configuration.

FIG. 6 shows additionally that frame 1 can be further collapsed by being detached at point 11 and pivotable about pivot point 50 in a forward manner. This enables ski vehicle 10 to be transported in a car or a plane in a substantially compressed state. Front ski 14 is selectively removed from fork assembly 7 by removal of a pivot post 26 from assembly 7 (see FIG. 1). A pivot point 27 can be a quick release pin such as those used on mountain bikes. It is appreciated that all of the release points 26, 9, 11, can be done in any number of ways including bolt, quick release pin, or any number of other pin attachments known in the art.

Figure 7:
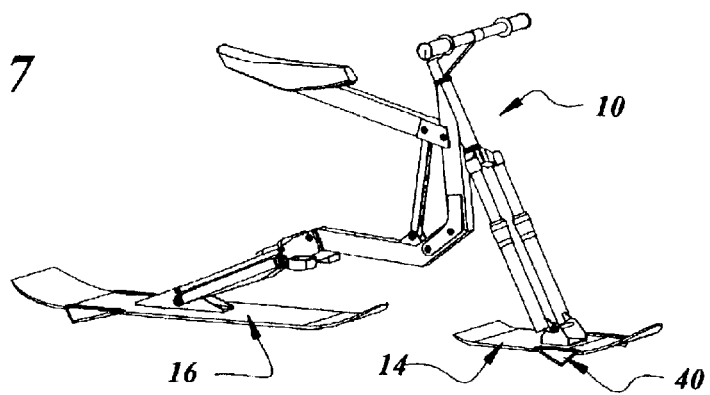
FIG. 7 shows a perspective view of the ski vehicle shown in FIG. 1 having fins on the skis thereof.

FIG. 7 shows a perspective view of snow vehicle 10 showing skis 14 and 16 having a fin 40 that extends from opposing edges of the first and second skis. Fins 40 perform a couple of different functions. For example, the fins 40 are designed such that when the rider is moving in a straight line, particularly when traversing across a slope, the fins create more edge contact for the ski vehicle 10 to grab the snow so as to prevent unwanted sliding down the slope. When turning, the fins 40 help to decrease the turning radius because when on edge the fins 40 create a smaller side cut radius.

Figure 8:
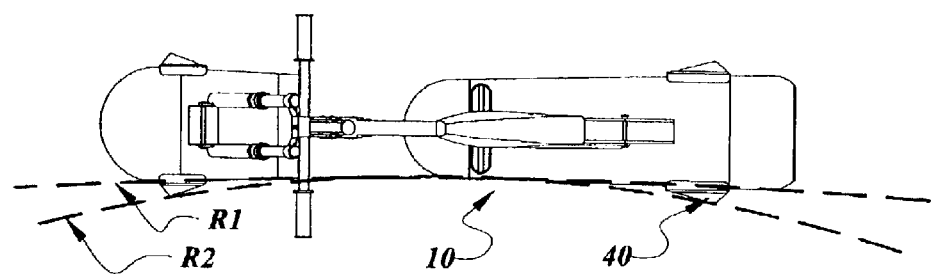
FIG. 8 shows a top plan view of the ski vehicle shown in FIG. 7.

FIG. 8 shows how the fins 40 are able to create a smaller side cut radius R2 Vs R1 with no fins. The side-cut radii are the two outer curves of the hyperbolic-shaped sides of the first and second skis 14 and 16 in combination. The fins 40 can be either fixed or removable so that the ski edges can get tuned up and ski-bottoms waxed.

Figure 9:
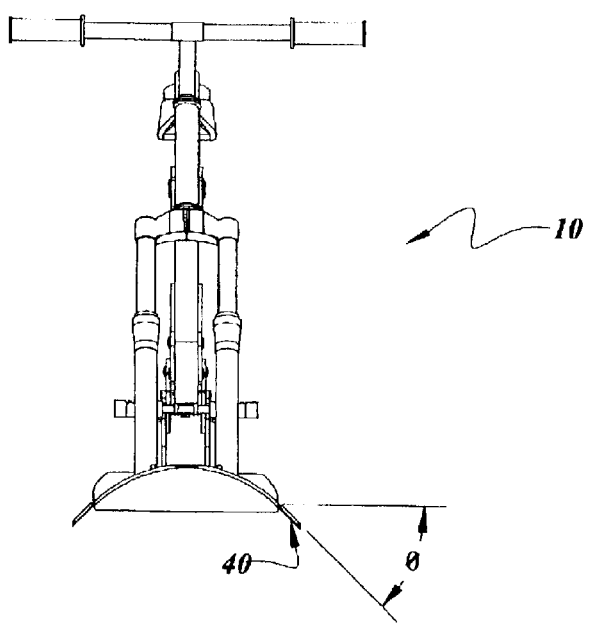
FIG. 9 shows a front plan view of the ski vehicle shown in FIG. 7.

FIG. 9 shows ski vehicle 10 in a front plan view indicating that the fins 40 can be designed with various angles θ relative to the mounting surface of the ski. Fins 40 can also be made from different material having different stiffness for varying conditions.

Depicted in FIG. 10 is an alternative embodiment of a snow vehicle 110. Like elements between the different snow vehicles disclosed herein are identified by like reference characters. Snow vehicle 110 has a unitary frame 101 with seat post 2 hingedly mounted thereto at an attachment point 102. A strut 108 has a first end hingedly mounted to seat post 2 at a pivot point 104 and an opposing second end removably connected to a pivot post 106 projecting from frame 101. By releasing strut 108 from pivot post 106, seat post 2 and seat 15 can be selectively lowered to the retracted position as shown in FIG. 11.

Returning to FIG. 10, the frame 101 attaches to rear ski 16 using substantially the same rear linkage as previously discussed with regard to snow vehicle 10. The front suspension is different. Attached to the frame 101 there is a head tube. Through the head tube there is a steering column 120. The steering column 120 attaches to a handle bar stem 122. A pivot point 124 is used to pivotally attach a handlebar assembly 126 to bar stem 122. Handle bar assembly 126 includes a handle bar tube 127, a handle bar 130, and grips 128 mounted on the handle bar 130.

A strut 134 rests inside the steer tube and moves telescopically in and out of the steer tube. Ski 14 is attached at one end of strut 134 by a pivot point 136 connecting to a bracket 148. A linkage 138 extends from pivot point 136 to a triangular shaped bracket 144. A shock absorber 117 extends between a pivot point 132 on bar stem 122 and a pivot point 142 on bracket 144. Bracket 144 also connects to the lower end of the steerer tube by a pivot point 146.

Figure 12:
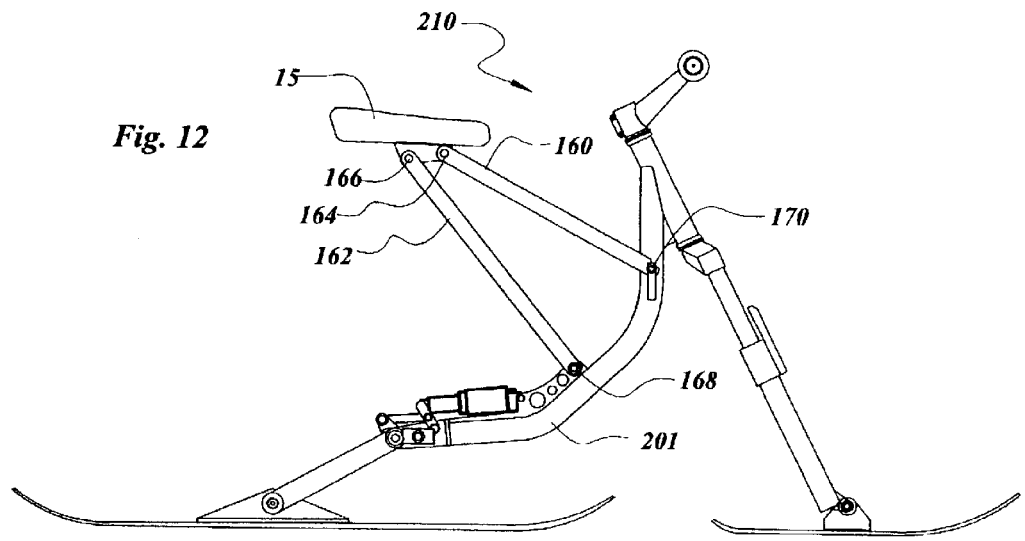
FIG. 12 shows a side plan view of another alternative embodiment of a ski vehicle.
Figure 13:
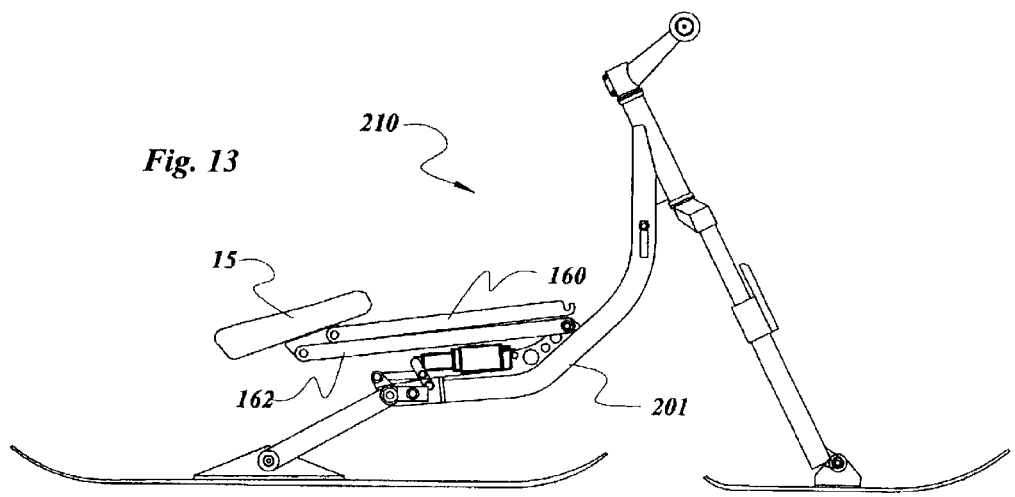
FIG. 13 shows a side plan view of the ski vehicle shown in FIG. 12 with the seat in a retracted position.

FIG. 12 shows another alternative embodiment of a ski vehicle 210. Ski vehicle 210 comprises a frame 201. A seat post 160 has a first end removably connected to frame 201 at a point 170. The point at 170 can be any conventional connection such as a pin, bolt, quick release connection (such as on a bicycle), clamp, latch, or any other type of fastener. Seat 15 is hingedly connected to an opposing second end of seat post 160 at a hinge point 164. A strut 162 has a first end hingedly attached to frame 201 at a hinge point 168. Strut 162 also has a second end hingedly attached to seat 15 at a hinge point 166. To lower the seat 15, strut 160 is disconnected from frame 201 at point 170 and the seat assembly rotates downward as shown in FIG. 13.

Figure 14:
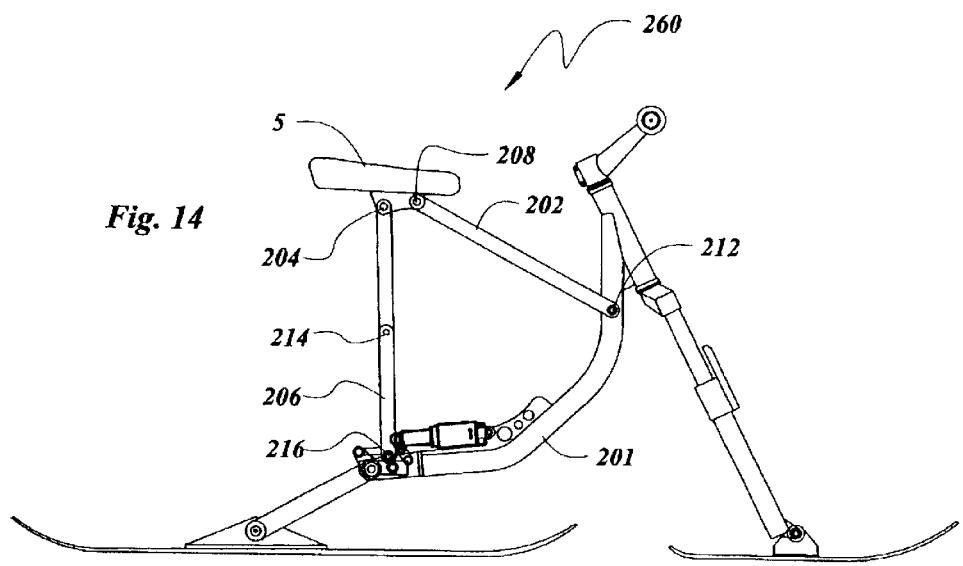
FIG. 14 shows a side plan view of another alternative embodiment of a ski vehicle.
Figure 15:
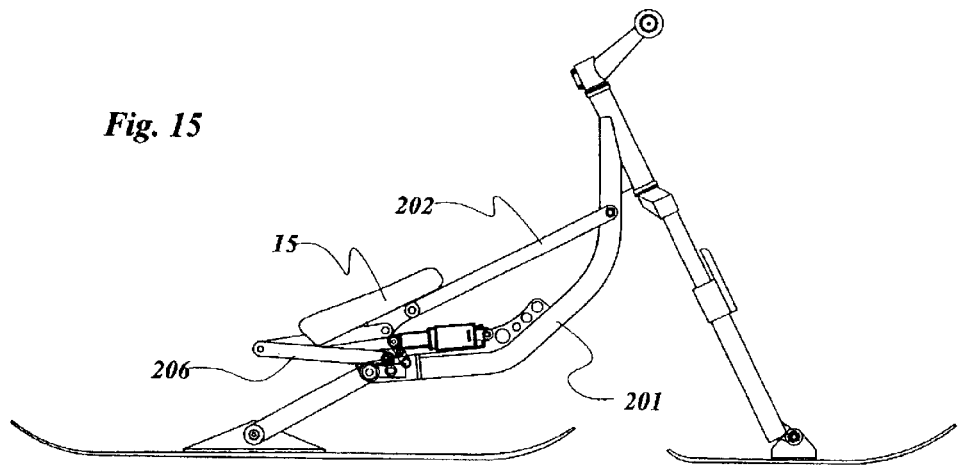
FIG. 15 shows a side plan view of the ski vehicle shown in FIG. 14 with the seat in a retracted position.

Depicted in FIG. 14 is another alternative embodiment of a snow vehicle 260. Snow vehicle 260 includes a seat post 202 having a first end 212 hingedly mounted to frame 201 and an opposing second end hingedly mounted to seat 15. A strut 206 has a first end 216 hingedly mounted to frame 201 and an opposing second end 210 hingedly mounted to seat 15. A hinge 214 is centrally formed on strut 206 to enable strut 206 to fold over. Various conventional locking mechanisms can be used to lock hinge 214 so as to prevent unwanted folding of strut 206. To retract seat 15 into the lowered position, strut 206 is folded as shown in FIG. 15.

Figure 16:
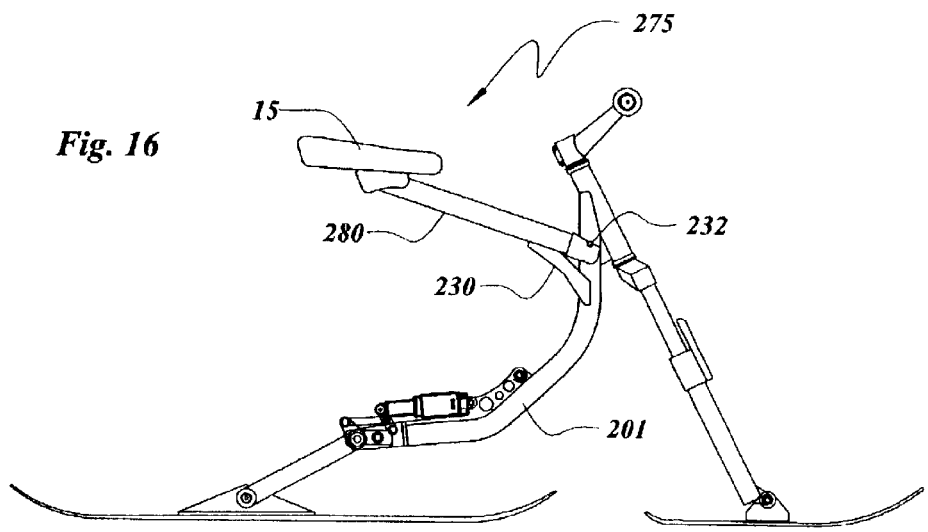
FIG. 16 shows a side plan view of another alternative embodiment of a ski vehicle.
Figure 17:
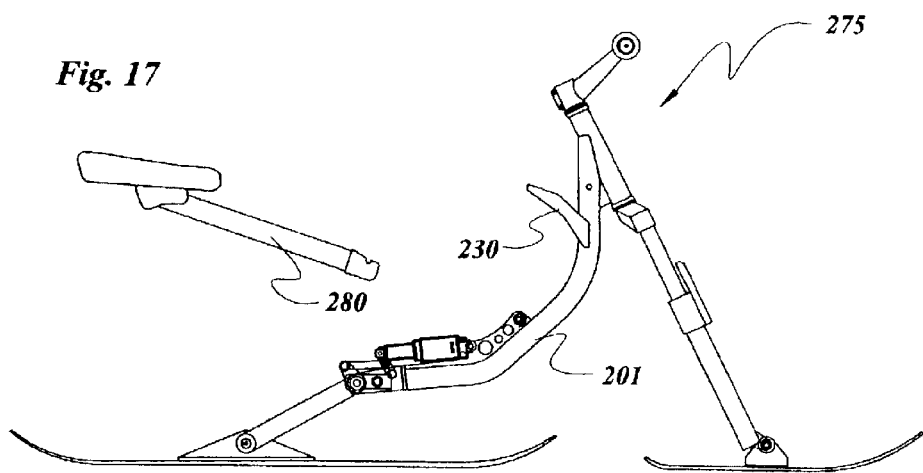
FIG. 17 shows a side plan view of the ski vehicle shown in FIG. 16 with the seat and seat post removed from the frame.

FIG. 16 shows yet another alternative embodiment of a snow vehicle 275. In this embodiment a seat post 280 has a first end removably attached to frame 201 at a point 232. In one embodiment, point 232 is a quick release type of attachment. Seat 15 is mounted at an opposing second end of seat post 280. A brace 230 mounted on frame 210 supports seat post 280 when seat post 280 is mounted to frame 201. As shown in FIG. 17, to remove seat 15 from frame 201, seat post 280 is simply disconnected from frame 201.

Figure 18:
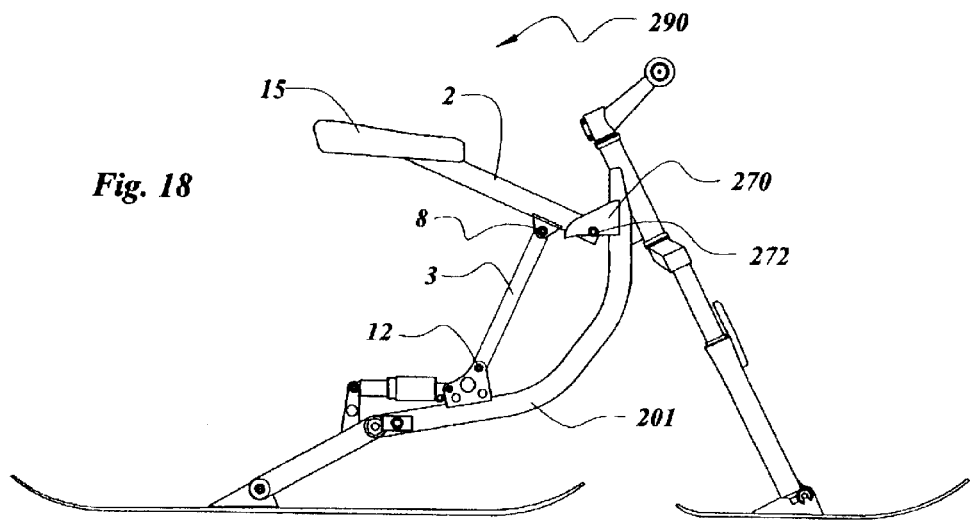
FIG. 18 shows a side plan view of another alternative embodiment of a ski vehicle.
Figure 19:
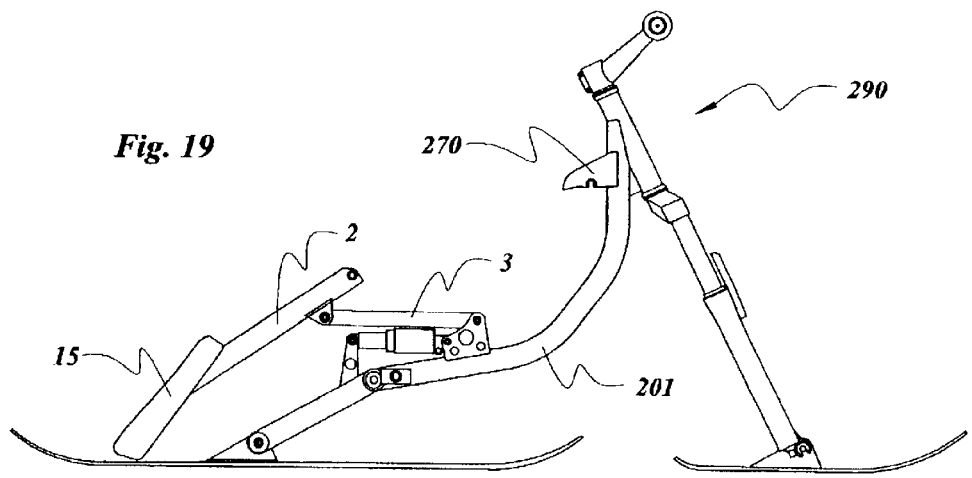
FIG. 19 shows a side plan view of the ski vehicle shown in FIG. 18 with the seat in a retracted position.

FIG. 18 shows yet another alternative embodiment of a ski vehicle 290. This embodiment is substantially the same as ski vehicle 10 depicted in FIG. 1 except with regard to how the seat post 2 attaches to the frame 201 and that the frame 201 is unitary. A bracket 270 is mounted to frame 201 and outwardly projects therefrom. The seat post 2 removably attaches to frame 201 at a point 272 on bracket 270. In one embodiment, point 272 is a quick disconnect mechanism. To lower the seat assembly, point 272 is released and the seat assembly is free to pivot down about point 12 as depicted in FIG. 19.

Figure 20:
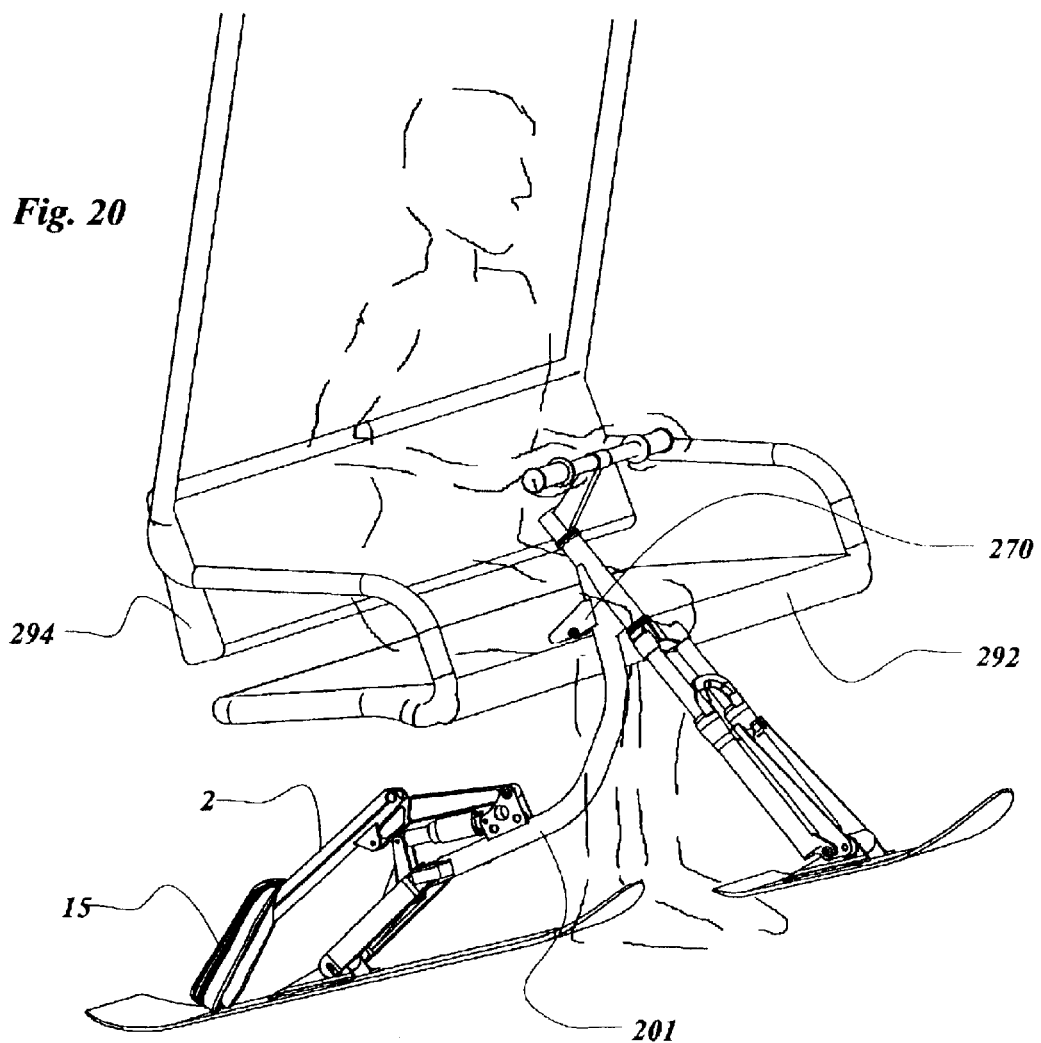
FIG. 20 shows a perspective view of the ski vehicle shown in FIG. 19 supported on a seat of a ski chair lift.

As depicted in FIG. 20, once seat post 2 is released from frame 201, bracket 270 is freely exposed to function as a support for resting ski vehicle 290 on a seat 292 of a ski chair lift 294. That is, as a ski chair lift 294 approaches from behind, the seat 292 of the ski chair lift passes over retracted seat 15 but below bracket 270. The seat 292 of the chair lift 294 thus hits frame 201 and begins to move ski vehicle 290 forward. As the seat 292 of the chair lift 294 begins to rise, the seat 292 catches on the bottom side of bracket 270 so that bracket 270 supports ski vehicle 290 on the seat 292 of the chair lift 294. It is appreciated that bracket 270 can be mounted on each of the embodiments disclosed herein for supporting the corresponding ski vehicle on the seat of a ski chair lift. In these other embodiments, bracket 270 can be independent of the seat assembly.

Figure 21:
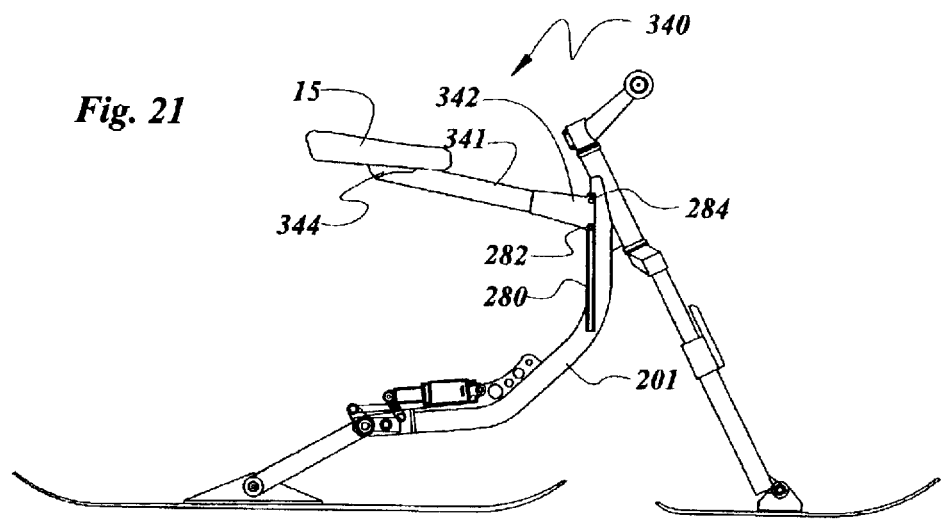
FIG. 21 shows a side plan view of another alternative embodiment of a ski vehicle.
Figure 22:
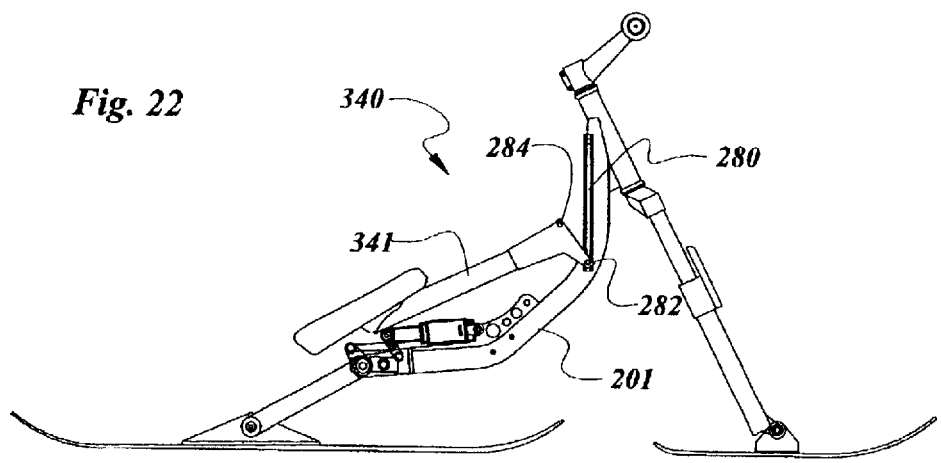
FIG. 22 shows a side plan view of the ski vehicle shown in FIG. 21 with the seat in a retracted position.

Depicted in FIG. 21 is still another embodiment of a ski vehicle 340. A slide rail 280 is mounted on frame 201. A seat post 341 has a first end 342 and an opposing second end 344. First end 342 of seat post 341 is removably attached to frame 201 at point 284 using any conventional methods such as a quick release mechanism. First end 342 of seat post 341 is also hingedly and slidably mounted on slide rail 280 at a point 282. Seat 15 is mounted at second end 344 of seat post 341. To lower the seat 15, point 284 is released from frame 201. Seat post 341 is then free to downwardly slid along slide rail 282 and downwardly pivot about point 282, as depicted in FIG. 22.

Figure 23:
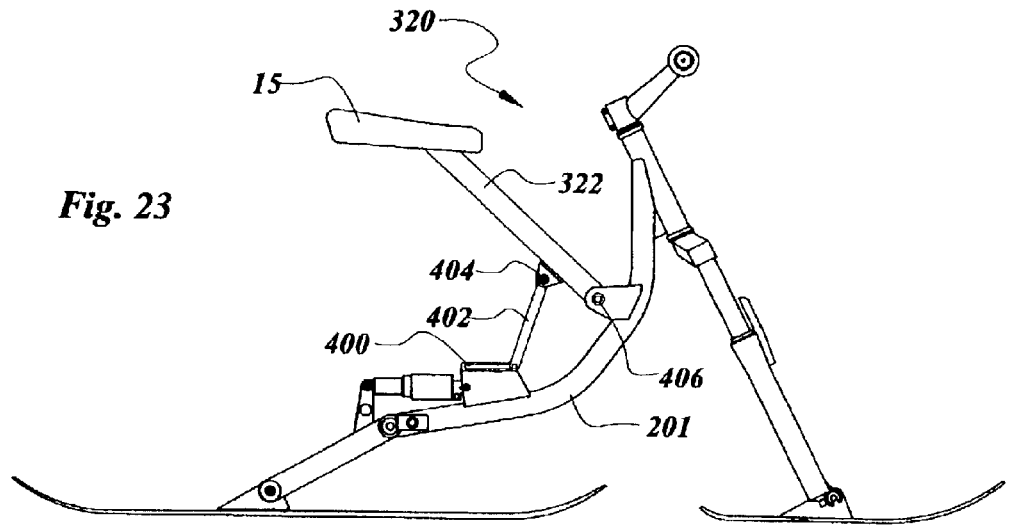
FIG. 23 shows a side plan view of yet another alternative embodiment of a ski vehicle.

FIG. 23 shows yet another embodiment of a ski vehicle 320. In this embodiment one end of a seat post 322 is pivotably attached to frame 201 at a pivot point 406. Seat 15 is mounted at the opposing end of seat post 322. Mounted on frame 201 is a slide rail 400. A strut 402 has a fist end rotatably mounted to seat post 322 at a point 404 and an opposing second end hingedly and slidably mounted to slide rail 400. A lock, such as a hand nut, is provided to enable the second end of strut 402 to be selectively positioned along the length of slide rail 400 so as to selectively adjust the height of seat 15. Advancing the second end of strut 402 to the rear end of slide rail 400 moves seat 15 to the fully retracted position.

Figure 24:
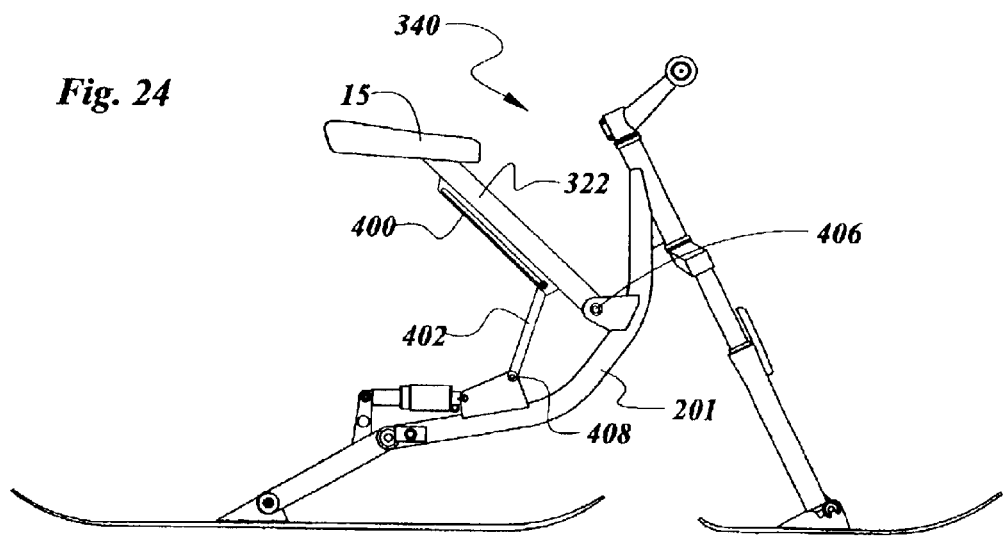
FIG. 24 shows a side plan view of still another alternative embodiment of a ski vehicle.

Depicted in FIG. 24 is another embodiment of a ski vehicle 340 that is similar to ski vehicle 320. In this embodiment, slide rail 400 is mounted on seat post 322. The first end of strut 402 is hingedly and slidably mounted to slide rail 400 with the second end of strut 402 being hingedly mounted to frame 201 at a point 408. A lock, such as a hand nut, is provided to enable the first end of strut 402 to be selectively positioned along the length of slide rail 400 so as to selectively adjust the height of seat 15.

Figure 25:
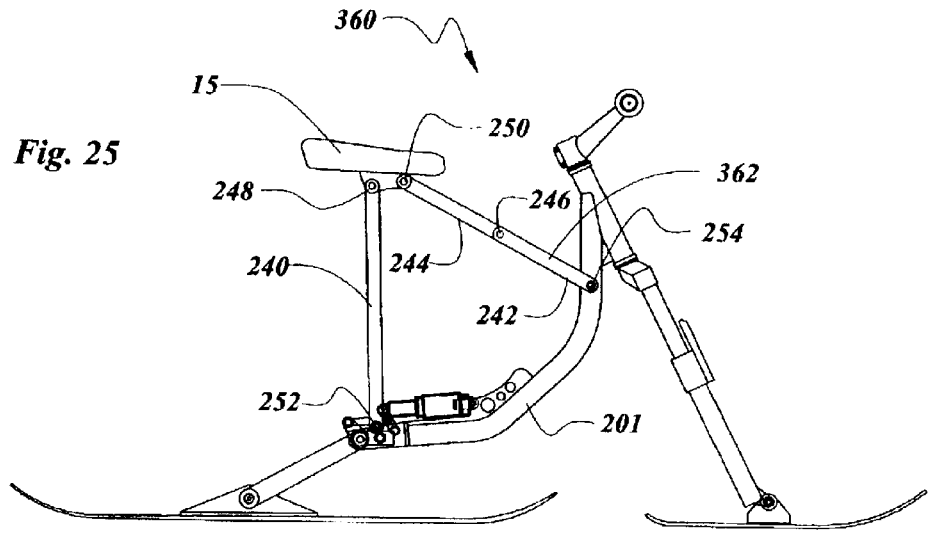
FIG. 25 shows a side plan view of a final alternative embodiment of a ski vehicle.
Figure 26:
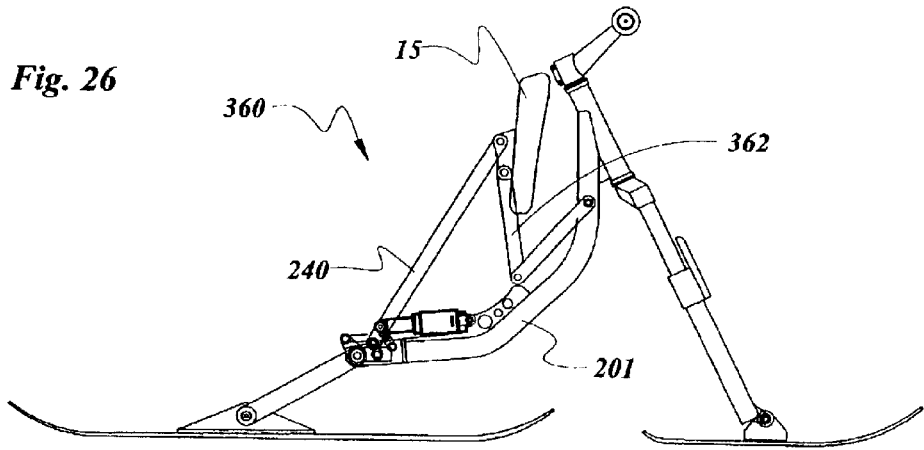
FIG. 26 shows a side plan view of the ski vehicle shown in FIG. 25 with the seat in a retracted position.
Figure 14:
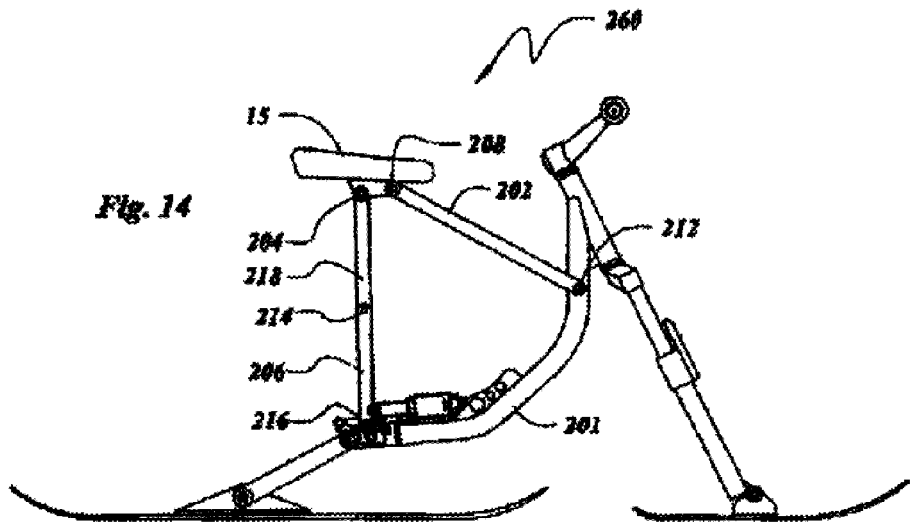
Figure 15:
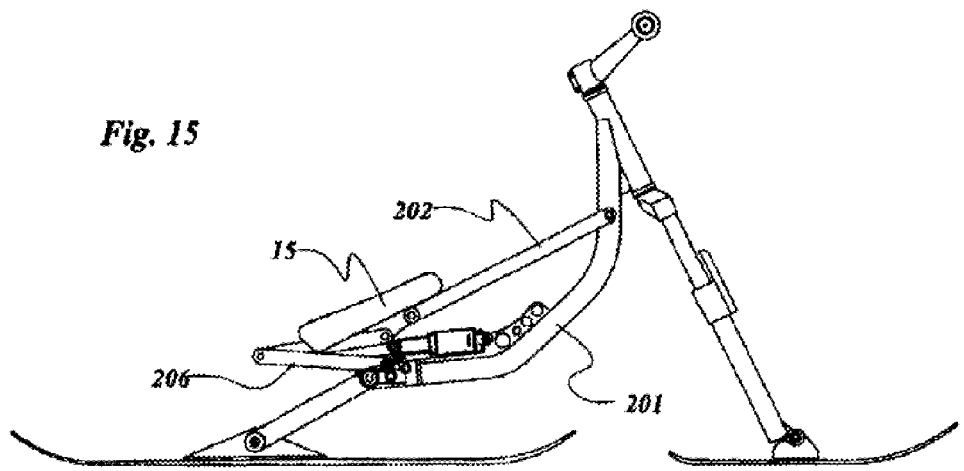

Finally, FIGS. 25 and 26 show a final embodiment of a ski vehicle 360. A strut 240 has a first end pivotably attached to seat 15 at point 248 and a second end pivotably attached to frame 201 at a pivot point 252. A seat post 362 has a first end pivotably attached to seat 15 at point 250 and a second end pivotably attached to frame 201 at a point 254. Seat post 362 is comprised of a first post portion 244 and a second post portion 242 which are hingedly connected together at a point 246. A locking mechanism permits selective locking of the hinge at point 246. To move seat 15 to the retracted position, the locking mechanism is released and seat post 362 is collapsed.

In one embodiment of the present invention means are provided for mounting the seat 15 to the frame of a ski vehicle such that the seat 15 can be selectively moved between a raised position and a lowered position relative to the frame. By way of example and not by limitation, the various structures depicted in FIGS. 1, 5, 6, 10–15, and 18–25, as discussed above, that allow for seat 15 to selectively raise and lower are examples of such means.

The present invention may be embodied in other specific forms without departing from its spirit or essential characteristics. For example, the above disclosure discusses a number of alternative embodiments of ski vehicles. It is appreciated that the various elements of each of the alternative embodiments can be mixed and matched to form a variety of other alternative embodiments that fall within the scope of the present invention. As such, the described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A ski vehicle comprising:
    a frame;
    a first ski mounted to the frame;
    a steering column rotatably mounted to the frame;
    a second ski mounted to the steering column;
    a seat;
    means for mounting the seat to the frame such that the seat can be selectively moved between a raised position and a lowered position relative to the frame; and
    a bracket mounted to the frame and projecting therefrom, the bracket being adapted to support the frame on a seat of a ski chairlift when the seat of the ski vehicle is in the lowered position.

2. A ski vehicle as recited in claim 1, wherein the frame comprises:
    an upper frame member; and
    a lower frame member hingedly mounted to the upper frame member.

3. A ski vehicle as recited in claim 1, further comprising:
    a link member extending between the frame and the first ski, the link member being hingedly mounted to both the frame and first ski; and
    a shock absorber connected with the link member and the frame.

4. A ski vehicle as recited in claim 1, wherein the means for mounting the seat to the frame comprises a seat post having a first end and an opposing second end, the first end of the seat post being selectively slidable along the length of the frame, the seat being mounted to the second end of the seat post.

5. A ski vehicle as recited in claim 1, wherein the means for mounting the seat to the frame comprises a seat post having a first end and an opposing second end, the first end of the seat post being hingedly or removably mounted to the frame, the seat being mounted to the second end of the seat post.

6. A ski vehicle as recited in claim 5, wherein the seat is hingedly mounted to the second end of the seat post.

7. A ski vehicle as recited in claim 5, further comprising a strut having a first end and an opposing second end, the first end of the strut being selectively slidable along the length of the seat post and/or the second end of the strut being selectively slidable along the length of the frame.

8. A ski vehicle as recited in claim 5, further comprising a strut having a first end and an opposing second end, the first end of the strut being removably mounted to the seat post and/or the second end of the strut being removably mounted to the frame.

9. A ski vehicle as recited in claim 5, further comprising a strut having a first end and an opposing second end, the first end of the strut being hingedly mounted to the seat or the seat post, the second end of the strut being hingedly mounted to the frame.

10. A ski vehicle comprising:
    a frame;
    a first ski mounted to the frame;
    a steering column rotatably mounted to the frame;
    a second ski mounted to the steering column;
    a seat post having a first end and an opposing second end, the first end of the seat post being hingedly or removably mounted to the frame;
    a seat mounted to the second end of the seat post; and
    a bracket mounted to the frame and projecting therefrom, the bracket being adapted to support the frame on a seat of a ski chairlift when the seat of the ski vehicle is in the lowered position.

11. A ski vehicle as recited in claim 10, wherein the seat is hingedly mounted to the second end of the seat post.

12. A ski vehicle as recited in claim 10, further comprising a strut having a first end and an opposing second end, the first end of the strut being hingedly mounted to the seat or the seat post, the second end of the strut being hingedly mounted to the frame.

13. A ski vehicle as recited in claim 10, further comprising a strut having a first end and an opposing second end, the first end of the strut being selectively slidable along the length of the seat post and/or the second end of the strut being selectively slidable along the length of the frame.

14. A ski vehicle as recited in claim 10, further comprising a strut having a first end and an opposing second end, the first end of the strut being removably mounted to the seat post or the seat, the second end of the strut being mounted to the frame.

15. A ski vehicle as recited in claim 10, wherein the seat post comprises:
a first member mounted to the frame; and
a second member mounted to the seat, the first member being hingedly mounted to the second member.

16. A ski vehicle as recited in claim 10, further comprising a strut, the strut comprising:
a first strut portion mounted to the seat or the seat post; and
a second strut portion mounted to the frame, the first strut portion being hingedly mounted to the second strut portion.

17. A ski vehicle as recited in claim 10, wherein the frame comprises:
an upper frame member; and
a lower frame member hingedly mounted to the upper frame member.

18. A ski vehicle as recited in claim 17, wherein:
the seat post is mounted to the upper frame member; and
further comprising a strut having a first end and an opposing second end, the first end of the strut being hingedly mounted to the seat or the seat post, the second end of the strut being hingedly mounted to the lower frame member.

19. A ski vehicle as recited in claim further comprising:
a link member extending between the frame and the first ski, the link member being hingedly mounted to both the frame and first ski; and
a shock absorber connected with the link member and the frame.

20. A ski vehicle as recited in claim 10, further comprising a foot peg outwardly projecting from each side of the frame.

21. A ski vehicle as recited in claim 10, wherein the steering column comprises a front fork.

22. A ski vehicle as recited in claim 10, further comprising a wing projecting from each side of the first ski.

23. A ski vehicle comprising:
a frame;
a first ski mounted to the frame;
a front fork rotatably mounted to the frame;
a second ski mounted to the front fork;
a seat mounted to the frame so as to selectively move between a raised position and a lowered position; and
a bracket mounted to the frame and projecting therefrom, the bracket being adapted to support the frame on a seat of a ski chairlift when the seat of the ski vehicle is in the lowered position.

24. A ski vehicle as recited in claim 23, wherein the frame comprises:
an upper frame member; and
a lower frame member hingedly mounted to the upper frame member.

25. A ski vehicle as recited in claim 23, further comprising:
a link member extending between the frame and the first ski, the link member being hingedly mounted to both the frame and the first ski; and
a shock absorber connected with the link member and the frame.

26. A ski vehicle as recited in claim 23, further comprising a seat post having a first end and an opposing second end, the first end of the seat post being selectively slidably along the length of the frame, the seat being mounted to the second end of the seat post.

27. A ski vehicle as recited in claim 23, further comprising a seat post having a first end and an opposing second end, the first end of the seat post being hingedly or removably mounted to the frame, the seat being mounted to the second end of the seat post.

28. A ski vehicle as recited in claim 27, wherein the seat is hingedly mounted to the second end of the seat post.

29. A ski vehicle as recited in claim 27, further comprising a strut having a first end and an opposing second end, the first end of the strut being selectively slidable along the length of the seat post and/or the second end of the strut being selectively slidable along the length of the frame.

30. A ski vehicle as recited in claim 27, further comprising a strut having a first end and an opposing second end, the first end of the strut being removably mounted to the seat post and/or the second end of the strut being removably mounted to the frame.

31. A ski vehicle as recited in claim 27, further comprising a strut having a first end and an opposing second end, the first end of the strut being hingedly mounted to the seat or the seat post, the second end of the strut being hingedly mounted to the frame.

* * * * *

UNITED STATES PATENT AND TRADEMARK OFFICE
CERTIFICATE OF CORRECTION

PATENT NO. : 6,783,134 B2  Page 1 of 3
APPLICATION NO. : 10/264081
DATED : August 31, 2004
INVENTOR(S) : Brad Geary It is certified that error appears in the above-identified patent and that said Letters Patent is hereby corrected as shown below:

Drawings
Replace Fig. 14 with the figure depicted herein below, wherein the seat has been changed from "5" to --15-- and wherein the "second end" of the "strut" has been labeled --218-- As shown in the attached sheet

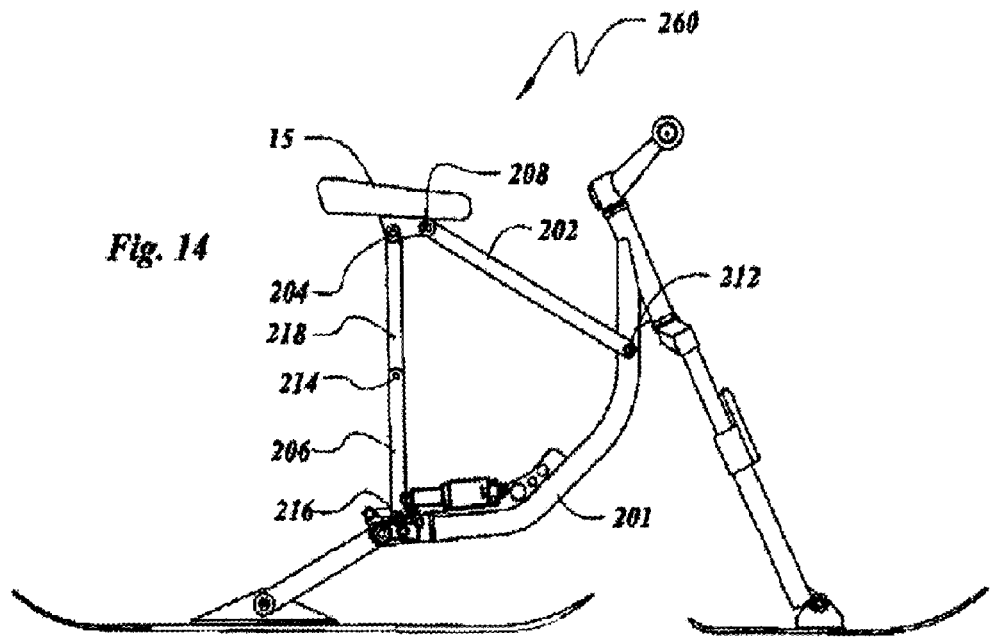

UNITED STATES PATENT AND TRADEMARK OFFICE
CERTIFICATE OF CORRECTION

PATENT NO. : 6,783,134 B2
APPLICATION NO. : 10/264081
DATED : August 31, 2004
INVENTOR(S) : Brad Geary It is certified that error appears in the above-identified patent and that said Letters Patent is hereby corrected as shown below:

Column 1
Line 59, before "bulkiness" change "it's" to --its--

Column 3
Line 42, after "upper subframe" change "1a" to --1b--
Line 43, after "lower subframe" change "1b" to --1a--
Line 44, before "is a seat" change "1a" change --1b--
Line 48, after "lower subframe" change "1b" to --1a--
Line 51, after "lower subframe" change "1b" to --1a--

Column 5
Line 6, after "seat" insert --15--

Column 6
Line 25, after "second end" change "210" to --218--
Line 36, before "supports" change "210" to --201--

Column 7
Line 8, before "along" change "slid" to --slide--
Line 15, after "402 has a" change "fist" to --first--

Column 9
Line 46, after "claim" insert --10--

Column 10
Line 29, after "selectively" change "slidably" to --slidable--

Signed and Sealed this

Fifteenth Day of April, 2008

JON W. DUDAS
*Director of the United States Patent and Trademark Office*